United States Patent
Oguri et al.

(10) Patent No.: US 11,852,286 B2
(45) Date of Patent: Dec. 26, 2023

(54) SENSOR BRACKET STRUCTURE

(71) Applicant: Honda Motor Co., Ltd., Tokyo (JP)

(72) Inventors: Masayuki Oguri, Tokyo (JP);
Yoshinori Gemba, Tokyo (JP); Daisuke Tsuburaoka, Tochigi Prefecture (JP);
Shinya Matsumoto, Tokyo (JP); Yu Hidaka, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/527,164

(22) Filed: Nov. 16, 2021

(65) Prior Publication Data
US 2022/0154876 A1 May 19, 2022

(30) Foreign Application Priority Data

Nov. 17, 2020 (CN) .......................... 202022656425.1

(51) Int. Cl.
*F16M 13/02* (2006.01)
*B60R 11/04* (2006.01)
*B60R 11/00* (2006.01)

(52) U.S. Cl.
CPC ............. *F16M 13/02* (2013.01); *B60R 11/04* (2013.01); *B60R 2011/004* (2013.01); *B60R 2011/0045* (2013.01)

(58) Field of Classification Search
CPC .... B60R 1/20; B60R 1/22; B60R 1/23; B60R 1/26; B60R 11/04; B60R 2011/004; B60R 2011/0045; B60W 2420/42; F16M 13/02
USPC ......... 248/200, 686, 674, 200.1, 220.1, 300, 248/309.1, 310
See application file for complete search history.

(56) References Cited

U.S. PATENT DOCUMENTS

| 4,232,286 | A | * | 11/1980 | Voll | G01V 3/101 |
| | | | | | 324/207.16 |
| 5,493,269 | A | * | 2/1996 | Durley | B60Q 1/544 |
| | | | | | 340/901 |
| 6,231,076 | B1 | * | 5/2001 | Blakesley | B60R 22/18 |
| | | | | | 180/271 |
| 6,729,429 | B2 | * | 5/2004 | Takahashi | B62D 25/084 |
| | | | | | 180/311 |
| 8,979,043 | B2 | * | 3/2015 | Florman | B23P 19/00 |
| | | | | | 248/248 |
| 10,059,280 | B2 | * | 8/2018 | Cooper | B60S 1/54 |
| 10,167,996 | B2 | * | 1/2019 | Cox | F16M 11/18 |
| 10,703,300 | B2 | * | 7/2020 | Koseki | B60S 1/56 |
| 10,707,567 | B2 | * | 7/2020 | Grimes | H01Q 1/1214 |
| 10,994,666 | B1 | * | 5/2021 | Bingle | B60Q 1/247 |
| 11,268,652 | B2 | * | 3/2022 | Garcia | H02B 1/044 |

(Continued)

FOREIGN PATENT DOCUMENTS

JP 2013204288 10/2013

*Primary Examiner* — Christopher Garft
*Assistant Examiner* — Michael McDuffie
(74) *Attorney, Agent, or Firm* — JCIPRNET (57) ABSTRACT

The disclosure provides a sensor bracket structure adapted to mount an external sensor to a moving body via a bracket. The bracket includes a fixing surface and a load receiving surface connected to the fixing surface. The external sensor is fixed to the fixing surface. The load receiving surface extends from the fixing surface toward the top in a direction where the load receiving surface intersects with the fixing surface. The load receiving surface extends from an outermost side of the external sensor toward the outside.

6 Claims, 9 Drawing Sheets

(56) References Cited

U.S. PATENT DOCUMENTS

| | | | |
|---|---|---|---|
| 11,345,290 B2* | 5/2022 | Hart | B60R 11/00 |
| 11,535,174 B2* | 12/2022 | Nakajima | B60R 13/04 |
| 2010/0148027 A1* | 6/2010 | Lenk | G01D 11/30 |
| | | | 248/309.1 |
| 2012/0327234 A1* | 12/2012 | Fish, Jr. | H04N 7/185 |
| | | | 348/148 |
| 2014/0346302 A1* | 11/2014 | Vignali | B64D 13/00 |
| | | | 29/428 |
| 2019/0308565 A1* | 10/2019 | Da Deppo | B60R 11/04 |

* cited by examiner

SENSOR BRACKET STRUCTURE

CROSS-REFERENCE TO RELATED APPLICATION

This application claims the priority benefit of Chinese application serial no. 202022656425.1, filed on Nov. 17, 2020. The entirety of the above-mentioned patent application is hereby incorporated by reference herein and made a part of this specification.

BACKGROUND

Technical Field

The disclosure relates to a sensor bracket structure.

Description of Related Art

In recent years, various image capturing devices, sensors, etc., have been attached to various parts of various transportation means, such as automobiles, loaders, and the amount of vehicles using sensors to acquire external information have been increasing. Sensors, such as millimeter wave radars, for acquiring external information are usually mounted inside the front/rear bumper of a vehicle and external components near the bumper. Such sensor is usually supported by a metal sensor bracket, and the sensor bracket is attached to a frame component of the vehicle body, etc.

Conventionally, the frame component where the image capturing device is fixed is formed in a U shape by bending a plate material, and the image capturing device is mounted inside the front/rear bumper of the vehicle and the external component of the vehicle near the bumper.

However, in the conventional technology, the frame component for mounting an image capturing device or a sensor, etc., into the front/rear bumper and the external component of the vehicle near the bumper generally has a simple structure. In the design of the conventional frame component, the mounting position of the sensor (such as a lens of an image capturing device) mounted through a post-process is not satisfactory. When the front/rear bumper of the vehicle or the external component of the vehicle takes an external impact, the sensor may not be damaged if an external force is exerted on the frame component where the sensor is fixed in a horizontal direction. However, since the mounting position of the frame component and the mounting angle of the sensor are not satisfactory, when the frame component is hit by a pendulum during a contact test, the unsatisfactory mounting angle of the sensor leads to unfavorable test results such as an offset axis of the sensor or even damages to the sensor. Therefore, if the mounting position of the frame component or the mounting angle of the sensor is not satisfactory, the test results with respect to the pendulum position during the contact test may be unfavorable. As a result, the sensor may be damaged, or the axis of the sensor may be offset.

SUMMARY

An aspect of the disclosure provides sensor bracket structure. adapted to mount an external sensor to a moving body via a bracket. The bracket includes a fixing surface and a load receiving surface connected to the fixing surface, the external sensor is fixed to the fixing surface, the load receiving surface extends from the fixing surface toward a top in a direction where the load receiving surface intersects with the fixing surface, and the load receiving surface extends from an outermost side of the external sensor toward an outside.

According to an embodiment of the disclosure, in the bracket, at least a portion of the fixing surface is surrounded by the load receiving surface, so that the external sensor is encompassed by the load receiving surface when the external sensor is fixed to the fixing surface.

According to an embodiment of the disclosure, multiple load receiving surfaces are provided on at least one of a side and another side of the fixing surface.

According to an embodiment of the disclosure, a connection surface connecting the load receiving surfaces is provided between the load receiving surfaces provided on the at least one of the side and the another side of the fixing surface, and the connection surface is provided on a load receiving side of the bracket.

According to an embodiment of the disclosure, the bracket further includes a mounting assistance surface, and the mounting assistance surface is provided on a side opposite to a load receiving side of the bracket and extends along a direction toward any one of the top or a bottom, wherein the bracket is mounted on the moving body through the mounting assistance surface and the fixing surface.

According to an embodiment of the disclosure, the bracket is fixed to an external component of the moving body.

According to an embodiment of the disclosure, the bracket is fixed to an external component of the moving body and held between the external component and a mounting part of a rigid component of the moving body, and a shape of the mounting assistance surface corresponds to a shape of the mounting part of the rigid component.

According to an embodiment of the disclosure, the mounting assistance surface has a stepped shape corresponding to the shape of the mounting part of the rigid component.

In order to make the above-mentioned features and advantages of the disclosure more understandable, the following embodiments are described in detail with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The disclosure provides a sensor bracket structure capable of suppressing a damage or an axial offset, etc., of an external sensor. Thus, the protection for the external sensor can be reinforced. Accordingly, according to the disclosure, the quality of the sensor bracket structure can be improved without increasing the number of parts.

According to an aspect of the disclosure, a sensor bracket structure is provided. The sensor bracket structure is adapted to mount an external sensor to a moving body via a bracket. The bracket includes a fixing surface and a load receiving surface connected to the fixing surface. The external sensor is fixed to the fixing surface. The load receiving surface extends from the fixing surface toward the top in a direction where the load receiving surface intersects with the fixing surface. The load receiving surface extends from an outermost side of the external sensor toward the outside.

Consequently, in the sensor bracket structure of the disclosure, in addition to being provided with the fixing surface for fixing the external sensor, the bracket is further provided with the load receiving surface for receiving a load. In addition, the load receiving surface is arranged to be connected with the fixing surface, and the load receiving surface extends from the outermost side of the external sensor toward the further outside. When the sensor bracket structure receives a load, such as the case where there is an external collision or impact exerting an external force on the moving body (e.g., a vehicle) to which the sensor bracket structure is mounted, even if the bracket receives a load of a certain extent, the external sensor S is like being surrounded by a solid object owing to the structural design of the bracket with the load receiving surface, and the load does not act on the external sensor. Therefore, the damage or the axial offset of the external sensor can be suppressed, and the protection for the external sensor can thus be reinforced. Therefore, the quality of the sensor bracket structure can be improved without increasing the number of parts.

According to an embodiment of the disclosure, in the bracket, at least a portion of the fixing surface is surrounded by the load receiving surface, so that the external sensor is encompassed by the load receiving surface when the external sensor is fixed to the fixing surface.

In this way, in the case where the external sensor is fixed to the fixing surface of the bracket, since the load receiving surface surrounds the fixing surface, when the bracket receives a load, the load does not act on the external sensor because the load receiving surface is provided to receive the load. Therefore, the protection for the external sensor can be reinforced.

According to an embodiment of the disclosure, multiple load receiving surfaces are provided on at least one of a side and another side of the fixing surface.

In this way, when the bracket receives a load, the multiple load receiving surfaces may take the load, and the load does not act on the external sensor. Consequently, the protection for the external sensor can be reinforced.

According to an embodiment of the disclosure, a connection surface connecting the load receiving surfaces is provided between the load receiving surfaces provided on the at least one of the side and the another side of the fixing surface, and the connection surface is provided on a load receiving side of the bracket.

In this way, the rigidity of the bracket is reinforced by providing the connection surface between the multiple load receiving surfaces. When the bracket receives a load, the load acts on the connection surface on the load receiving side of the bracket and is prevented from acting on the external sensor. Accordingly, the protection for the external sensor is reinforced.

According to an embodiment of the disclosure, the bracket further includes a mounting assistance surface, and the mounting assistance surface is provided on a side opposite to a load receiving side of the bracket and extends along a direction toward any one of the top or a bottom. The bracket is mounted on the moving body through the mounting assistance surface and the fixing surface.

Accordingly, the bracket is fixed to the moving body at different parts through the fixing surface and the mounting assistance surface. By fixing the bracket to the moving body in different directions at the same time, the mounting strength when the bracket is fixed to the moving body is increased. When the bracket receives a load, since the mounting strength of the bracket is reinforced, the axial offset of the external sensor fixed to the bracket can be prevented. Thus, the protection for the external sensor can be reinforced.

According to an embodiment of the disclosure, the bracket is fixed to an external component of the moving body.

Accordingly, the bracket is arranged to be fixed to the external component of the moving body at different parts and in different directions. By fixing the bracket to the external component of the moving body at different parts through the fixing surface and the mounting assistance surface, the bracket can be fixed to the external component of the moving body in different directions at the same time. Therefore, the mounting strength when the bracket is fixed to the moving body is increased. Since the mounting strength of the bracket is increased, the bracket is able to move with the external component within a wide range when the bracket receives a load. As a result, the damage or the axial offset of the external sensor can be suppressed, and the protection for the external sensor can be reinforced. In other words, a load resulting from twisting is not exerted on the bracket, and the load can be prevented from acting on the external sensor.

According to an embodiment of the disclosure, the bracket is fixed to an external component of the moving body and held between the external component and a mounting part of a rigid component of the moving body, and a shape of the mounting assistance surface corresponds to a shape of the mounting part of the rigid component.

Accordingly, when the bracket receives a load and retreats in the direction toward the moving body, due to the presence of the rigid component of the moving body (e.g., the sheet metal of the vehicle body), the retreat of the bracket toward the moving body can be avoided as much as possible, and the load can thus be absorbed effectively. In this way, the protection for the external sensor can be reinforced.

According to an embodiment of the disclosure, the mounting assistance surface has a stepped shape corresponding to the shape of the mounting part of the rigid component.

In this way, the bracket is fixed to the external component of the moving body. When the bracket receives a load so the external component contacts the bracket contact and retreats in the direction toward the moving body, since the stepped shape of the mounting assistance surface corresponds to the stepped shape of the mounting part of the rigid component, the load generated when the mounting assistance surface abuts against the sheet metal of the vehicle body is not offset. Therefore, a damage can be avoided, and the protection for the external sensor can be reinforced.

Based on the above, in the sensor bracket structure according to the disclosure, since the bracket exhibits a structural design including the fixing surface and the load receiving surface, the external sensor is protected as being surrounded by a solid object, and a load does not act on the external sensor fixed to the fixing surface. Therefore, the damage or the axial offset of the external sensor can be suppressed, and the protection for the external sensor can be reinforced. Therefore, the disclosure provides a sensor bracket structure with improved quality without increasing the number of parts.

In the following, the embodiments of the disclosure will be described with reference to the accompanying drawings. It should be noted that, unless otherwise specified, the orientations, such as front, rear, left, right, top, bottom, etc., in the following descriptions are assumed to be the same as the orientations of a vehicle V described in the following. Also, an arrow FR indicating the front of the vehicle, an arrow R indicating the right of the vehicle, and an arrow UP indicating the top of the vehicle are marked at suitable parts in the drawings accompanying the following descriptions.

Figure 1:
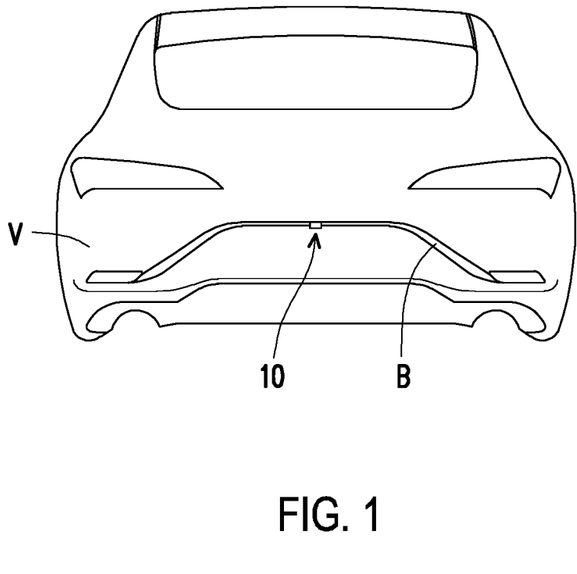
FIG. 1 is a schematic view illustrating that a sensor bracket structure according to an embodiment of the disclosure is mounted on an external component of a moving body.

FIG. 1 is a schematic view illustrating that a sensor bracket structure according to an embodiment of the disclosure is mounted on an external component of a moving body. As shown in FIG. 1, FIG. 1 is a schematic view illustrating that a sensor bracket structure 10 according to the embodiment is mounted on an external component (e.g., a bumper) B of a moving body V (e.g., transportation means such as an automobile, a motor vehicle, a carrier, etc.). In the embodiment, the sensor bracket structure 10 mounted on a rear bumper RB of the vehicle is described as an example. Based on practical needs, the sensor bracket structure 10 of the disclosure may be mounted on an arbitrary part on the front bumper of the moving body V, and may also be mounted on a rigid component of the moving body V, such as a sheet metal of the vehicle body.

Figure 2:
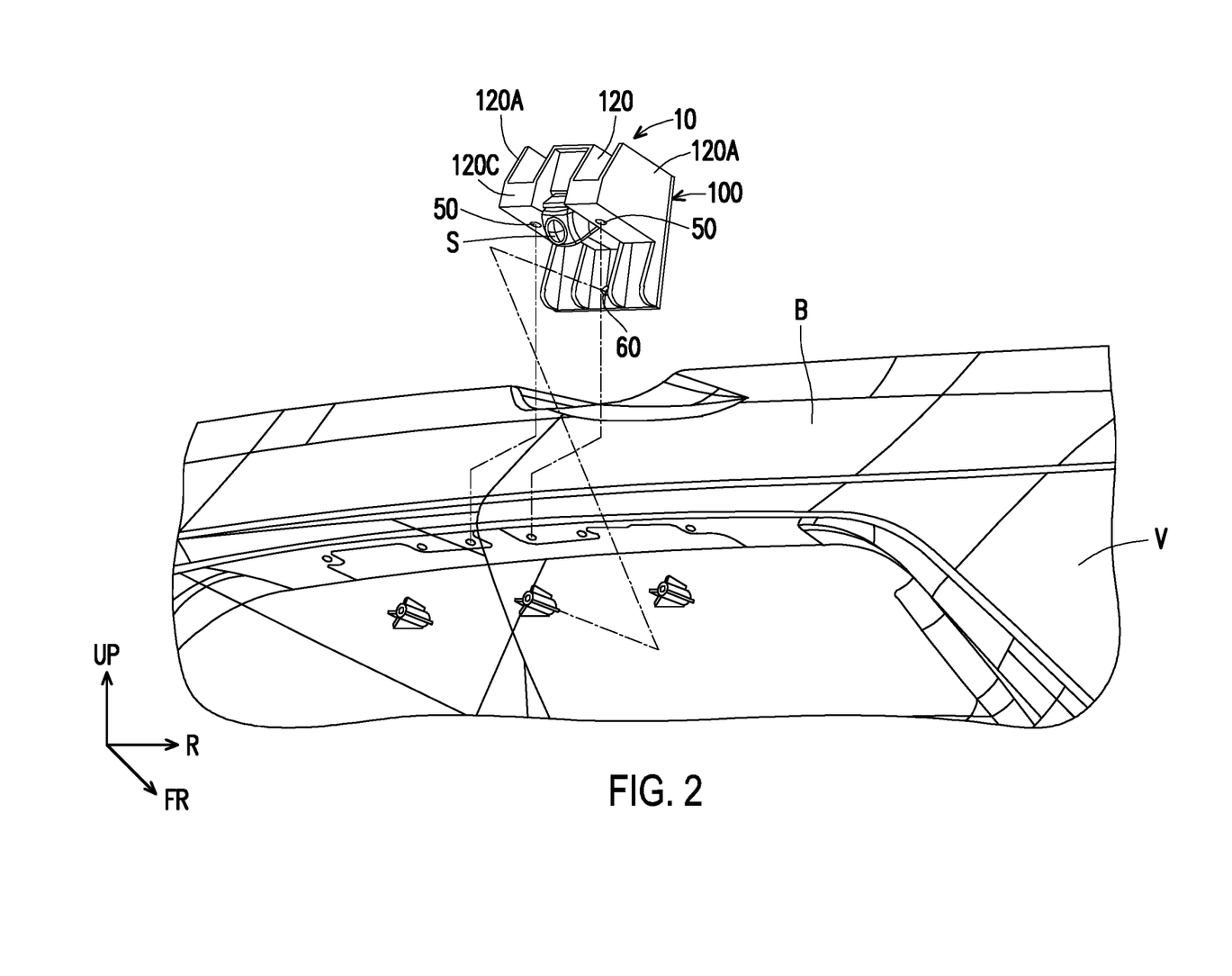
FIG. 2 is a schematic enlarged view illustrating a mounting location between the sensor bracket structure according to an embodiment of the disclosure and the moving body.
Figure 3:
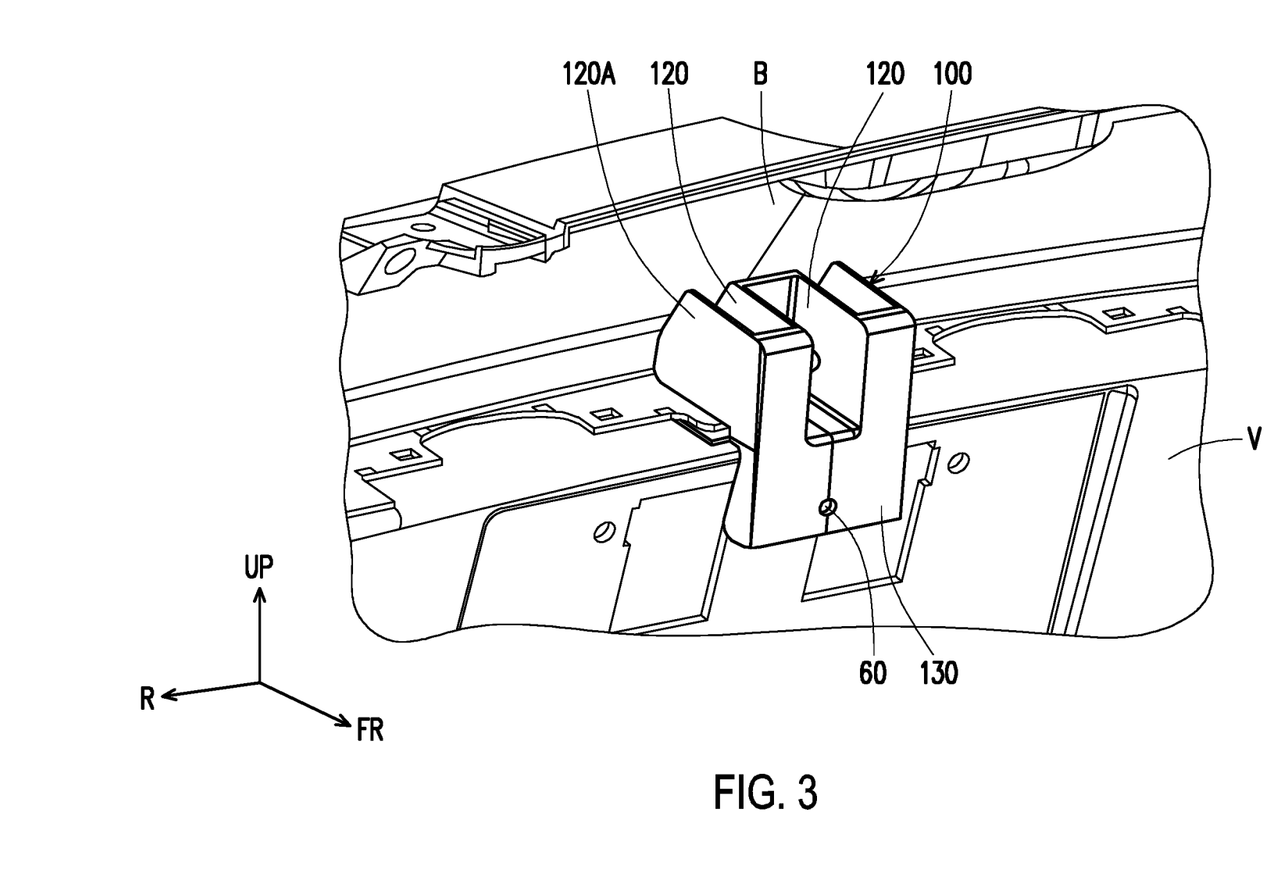
FIG. 3 is a schematic view illustrating that the sensor bracket structure according to an embodiment of the disclosure is mounted on a mounting part of the external component of the moving body.
Figure 4:
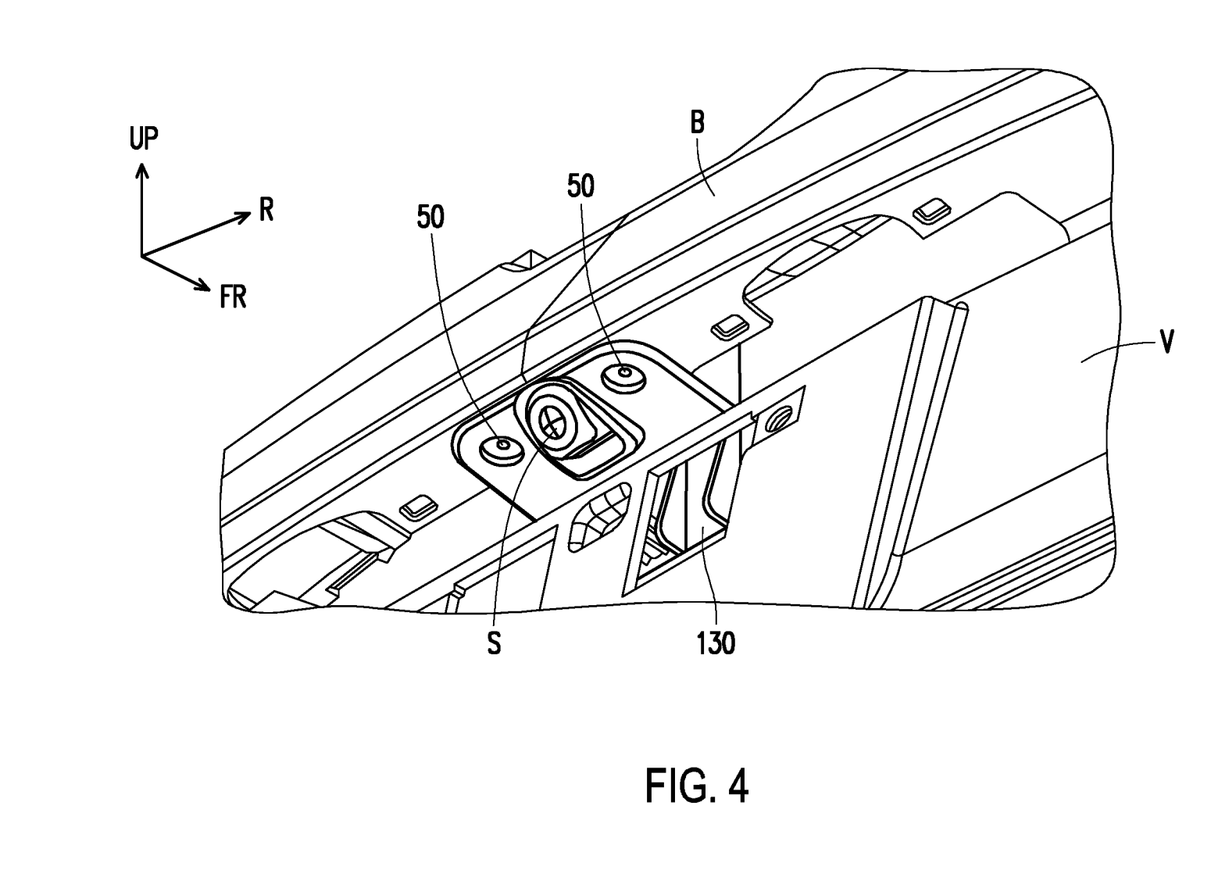
FIG. 4 is a schematic view illustrating that the sensor bracket structure of FIG. 3 is mounted on the mounting part of the external component of the moving body from another perspective.
Figure 5:
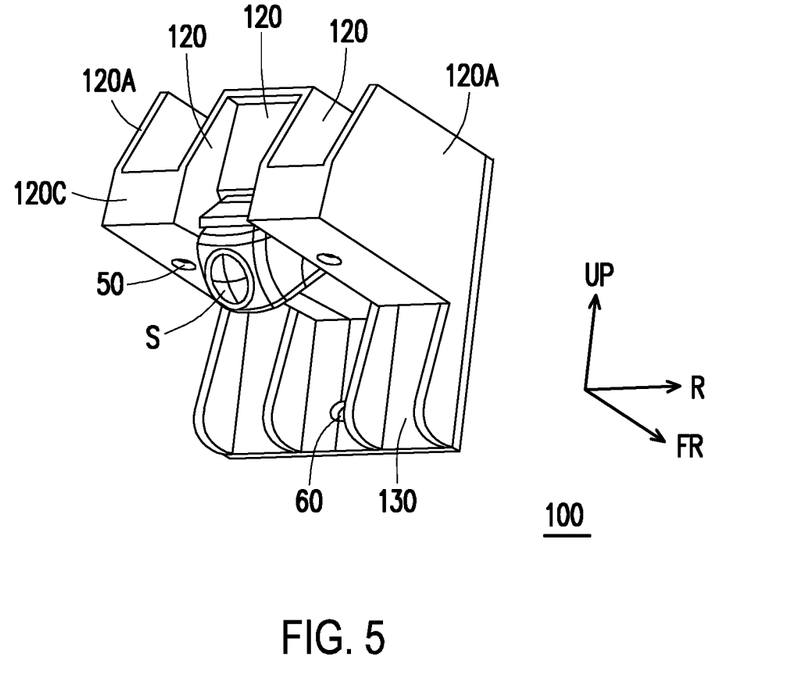
FIG. 5 is a schematic view illustrating a bracket of the sensor bracket structure according to an embodiment of the disclosure.

FIG. 2 is a schematic enlarged view illustrating a mounting location between the sensor bracket structure according to an embodiment of the disclosure and the moving body. FIG. 3 is a schematic view illustrating that the sensor bracket structure according to an embodiment of the disclosure is mounted on a mounting part of the external component of the moving body. FIG. 4 is a schematic view illustrating that the sensor bracket structure of FIG. 3 is mounted on the mounting part of the external component of the moving body from another perspective. FIG. 5 is a schematic view illustrating a bracket of the sensor bracket structure according to an embodiment of the disclosure. FIGS. 6A to 6E are schematic views illustrating the bracket of FIG. 5 from different perspectives.

Referring to FIGS. 2 to 5, an external sensor S may be fixed to a bracket 100. The bracket 100 to which the external sensor S is fixed is suitable for being mounted on the rigid component of the moving body V or the external component B. In the embodiment shown in FIGS. 2 to 3, an example in which the bracket 100 to which the external sensor S is fixed is mounted on the external component B of the moving body V is described. The external sensor S may be a sensor for acquiring external information, such as a millimeter wave radar. In addition, the external sensor S may also be an external detecting camera serving as an external detecting sensor. The external detecting camera may be, for example, a digital camera using a solid state image capturing device such as a charge coupled device (CCD), a complementary metal oxide semiconductor (CMOS), etc. The external detecting camera, for example, periodically and repetitively captures images in front of or behind the vehicle (depending on where the camera is disposed, such as the front or rear side of the vehicle). The information detected by the external detecting camera is used to identify the location, the type, the velocity, etc., of an object in a detection direction. Based on such identification, driver assistance control, automatic driving control, etc., of the moving body can be carried out. By displaying an image near the front or the rear of the vehicle captured by using the external detecting camera on a monitor in the vehicle compartment, the driver is provided with assistance to prevent the front or rear bumper of the vehicle from bumping into an obstacle when the vehicle is backing into a garage, etc.

In the embodiment, the bracket 100 of the sensor bracket structure 10 has a structure formed by multiple plate-like walls. In the disclosure, the material for forming the bracket 100 is not particularly limited. Examples of the material may include, for example, metal, alloy, resin, composite materials, etc. The material of the bracket 100 may also include a composite material with the following combination (e.g., a combination of PC and PBT materials, that is, polybutylene terephthalate (PBT) and polycarbonate (PCT)).

Figure 6A:
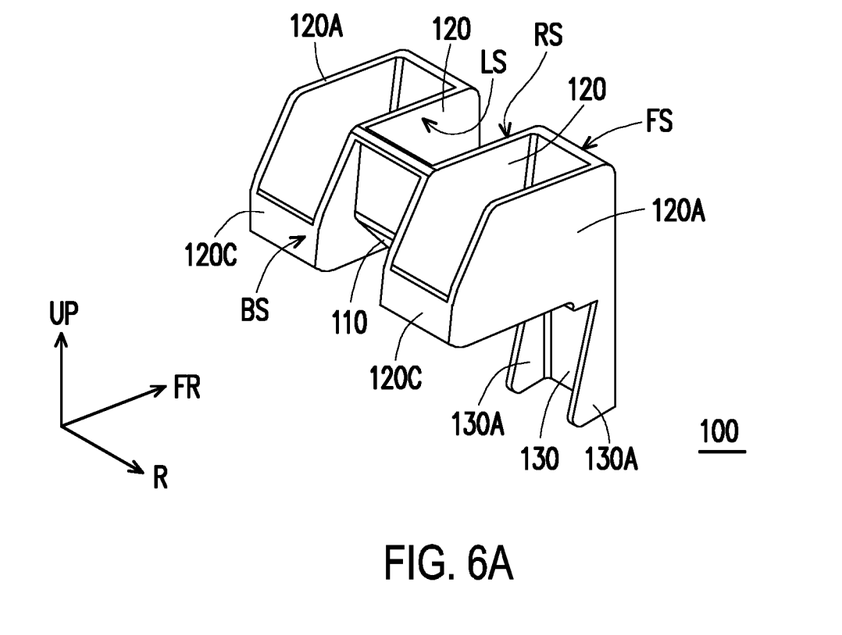
FIGS. 6A to 6E are schematic views illustrating the bracket of FIG. 5 from different perspectives.
Figure 6B:
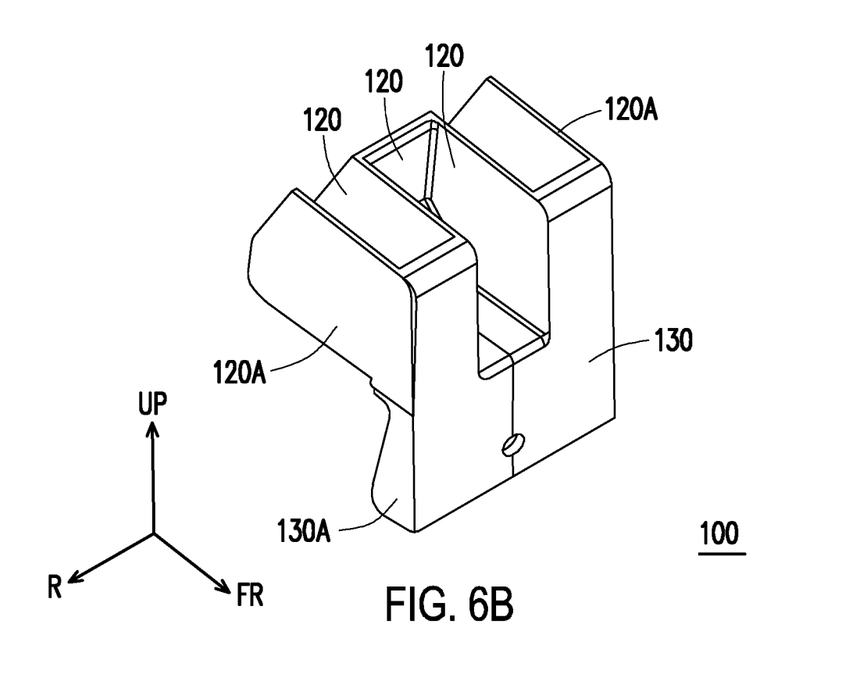
Figure 6C:
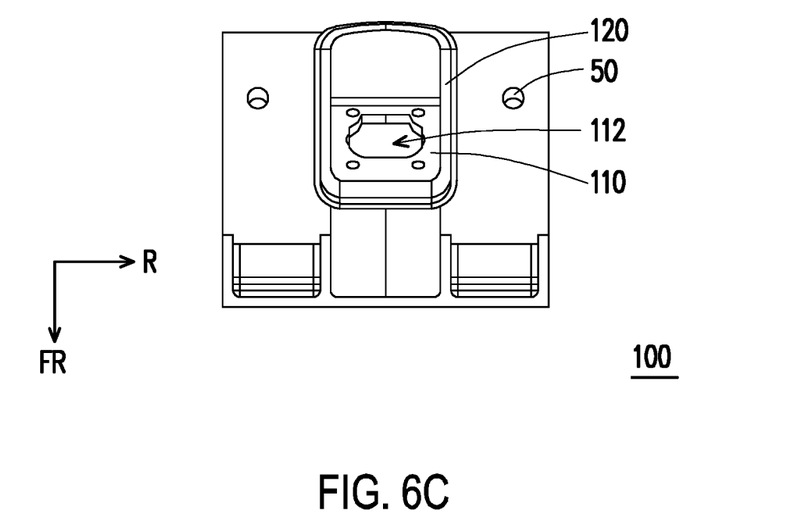
Figure 6D:
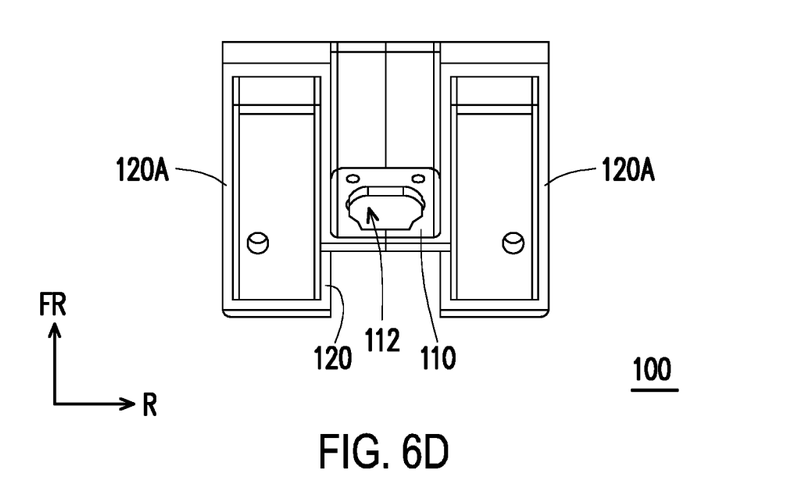
Figure 6E:
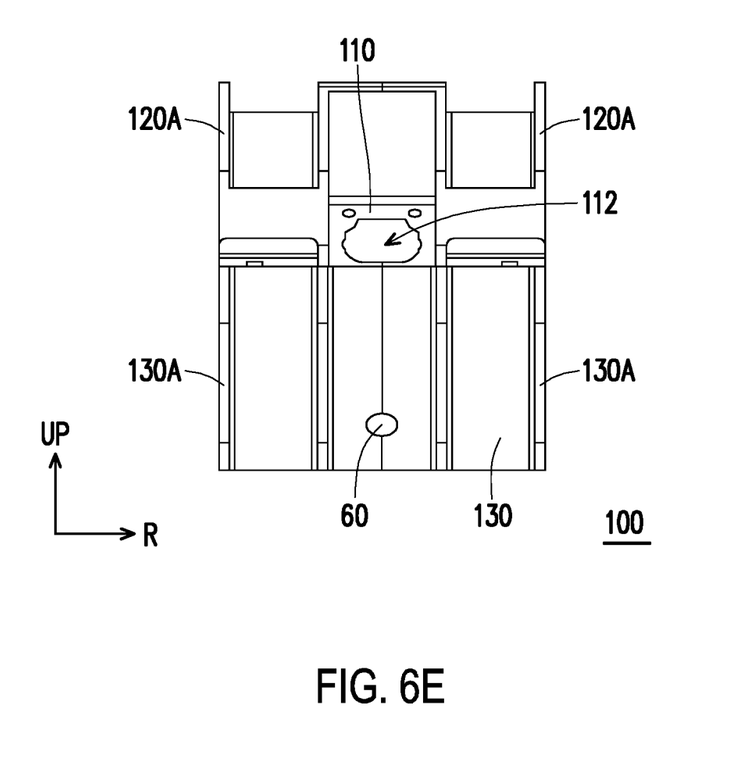

As shown in FIGS. 5 to 6E, the bracket 100 includes a fixing surface 110 and a load receiving surface 120 connected to the fixing surface 110. The external sensor S is adapted to be fixed to the fixing surface 110. For example, a fixing opening 112 may be formed on the fixing surface 110, and the external sensor S may be fixed to the fixing surface 110 through the fixing opening 112. The load receiving surface 120 is formed to extend from the edge of the fixing surface 110 toward the top (the direction UP in FIG. 5) in a direction where the load receiving surface intersects with the fixing surface 110. In addition, the load receiving surface 120 extends from the outermost side of the external sensor S toward the outside. In other words, when the bracket 100 to which the external sensor S is fixed is mounted on the moving body V, the entire external sensor S is surrounded within a space formed by the load receiving surface 120 and the external sensor S does not protrude out of the bracket 100. Accordingly, the mounting position of the sensor bracket structure 10 is favorable, and the mounting angle of the external sensor S is improved. Thus, when the bracket 100 is hit by a pendulum during a contact test, the external sensor S neither exhibits an axial offset nor be damaged, and the test results in the contact test are favorable. The fixing surface 110 is arranged to be inclined with respect to a plane in the front-rear direction or the left-right direction. When the external sensor S is fixed to the fixing surface 110 and the bracket 100 is mounted on the moving body V, the axis of the external sensor S passes through the fixing opening 112. In this way, the lens of the external sensor S is reliably located at an angle and a position able to detect or capture an image of the environment as required.

Thus, in the sensor bracket structure 10 of the disclosure, in addition to being provided with the fixing surface 110 for fixing the external sensor S, the bracket 100 is further provided with the load receiving surface 120 for receiving a load. In addition, the load receiving surface 120 is arranged to be connected with the fixing surface 110, and the load receiving surface 120 extends from the outermost side of the external sensor S toward the further outside (i.e., toward a direction away from the moving body V). When the sensor bracket structure 10 receives a load, such as the case when an external collision or impact occurs and an external force is exerted on the moving body V to which the sensor bracket structure 10 is mounted, even if the bracket 100 may receive a load of a certain extent, the external sensor S is surrounded by a solid object owing to the structural design of the bracket 100 with the load receiving surface 120, and the load does not act on the external sensor S. Therefore, the damage or the axial offset of the external sensor S can be suppressed, and the protection for the external sensor S can be reinforced. Therefore, the quality of the sensor bracket structure 10 can be improved without increasing the number of parts.

With the design of the sensor bracket structure 10 according to the embodiment, the sensor mounted in a post-process is mounted at a favorable position. In the case where the front/rear bumper of the vehicle or the external component of the vehicle receives an external impact, since the structural design of the bracket 100 includes the structural design of the load receiving surface 120, the sensor bracket structure 10 of the embodiment is mounted at a favorable position and the mounting angle of the sensor is also favorable over to the conventional technology. When the bracket 100 is hit by a pendulum during a contact test, the axis of the external sensor S is not offset or the external sensor S is not damaged, and the results of the contact test are favorable.

In the embodiment, the load receiving surface 120 is arranged to surround at least a portion of the fixing surface 110. Accordingly, when the external sensor S is fixed to the fixing surface 110, the external sensor S is encompassed by the load receiving surface 120. As shown in FIGS. 5 and 6E, the load receiving surface 120 is formed as a plate-like material extending from the rear edge in the left-right direction and the left and right edges in the front-rear direction of the fixing surface 110 toward the top (the direction UP). A space is formed in the middle, in which the fixing surface 110 is surrounded.

In this way, in the case where the external sensor S is fixed to the fixing surface 110 of the bracket 100, since the load receiving surface 120 surrounds the fixing surface 110, when the bracket 100 receives a load, the load does not act on the external sensor S because the load receiving surface 120 is provided to receive the load. Therefore, the protection for the external sensor S can be reinforced.

According to an embodiment of the disclosure, multiple load receiving surfaces 120 are provided on at least one of a side (e.g., a left side LS in FIG. 5) and another side (e.g., a right side RS in FIG. 5) of the fixing surface 110. The embodiment is described by taking the bracket 100 shown in FIG. 5 as an example. As shown in FIG. 5, to reinforce the rigidity of the bracket 100, load receiving surfaces 120A are additionally provided on the left side LS and the right side RS of the fixing surface 110. The load receiving surfaces 120A are substantially parallel to the load receiving surface 120 formed to surround a portion of the fixing surface 110. In other words, in the embodiment, the fixing surface 110 is arranged to be inclined with respect to a plane including the front-rear direction and the left-right direction, and the load receiving surfaces 120 and 120A substantially parallel to each other are provided to be substantially perpendicular to the plane including the front-rear direction and the left-right direction.

In this way, when the bracket 100 receives a load, the multiple load receiving surfaces 120 and 120A may take the load, and the load does not act on the external sensor S. Thus, the protection for the external sensor S can be reinforced.

According to an embodiment of the disclosure, a connection surface 120C connecting the load receiving surface 120 and the load receiving surface 120A is provided between the multiple load receiving surfaces provided on at least one of the side (e.g., the left side LS in FIG. 5) and the another side (e.g., the right side RS in FIG. 5) of the fixing surface 110, i.e., between the load receiving surface 120 and the load receiving surface 120A. In addition, the connection surface 120C is provided on the load receiving side of the bracket 100 (e.g., the rear side with respect to the moving body in the example shown in FIG. 5).

In this way, the rigidity of the bracket 100 is reinforced by providing the connection surface 120C between the load receiving surface 120 and the load receiving surface 120A. When the bracket 100 receives a load, the load acts on the connection surface 120C on the load receiving side of the bracket 100 and is prevented from acting on the external sensor S. Accordingly, the protection for the external sensor S is reinforced.

In the embodiment, as described above, the structure of the bracket 100 is formed as including a wall (i.e., the structure formed by the multiple load receiving surfaces 120 and 120A and the connection surface 120C) provided in the top-down direction perpendicular to the horizontal direction on the periphery of the fixing surface 110 on which the external sensor S is mounted. Accordingly, the entire bracket 100 can receive the load is received by the entire bracket 100 and prevented from acting on the external sensor S. In this way, a damage or an axial offset of the external sensor S is avoided.

When the bracket 100 is mounted on the moving body V, the bracket 100 may be mounted on a rigid component of the moving body V (such as a sheet metal of the vehicle body) or mounted on an external component B provided on the rigid component. FIG. 2 illustrates an example where the bracket 100 is mounted on the external component B of the moving body V, and this example describes a case where the bracket 100 is mounted on the rear bumper of a vehicle. When the bracket 100 is mounted on the external component B, the fixing surface 110 and the external component B may be fixed to each other by tapping. The embodiment chooses not to adopt a fixing means using a bolt, which requires drilling in advance, but adopts tapping to avoid breakage caused by a bolt hole.

Besides, according to an embodiment of the disclosure, the bracket 100 further includes a mounting assistance surface 130. The mounting assistance surface 130 is provided on a side (e.g., a front side FS in FIG. 5) opposite to the load receiving side (e.g., a rear side BS in FIG. 5) of the bracket 100, and extends along a direction (the direction UP) toward one of the top and the bottom. The bracket 100 is mounted on the moving body V through the mounting assistance surface 130 and the fixing surface 110.

Accordingly, the bracket 100 is fixed to the moving body V at different parts through the fixing surface 110 and the mounting assistance surface 130. By fixing the bracket 100 to the moving body V in different directions (e.g., the left-right direction and the top-down direction shown in FIGS. 3 and 4) at the same time, the mounting strength when the bracket 100 is fixed to the moving body V is increased. When the bracket 100 receives a load, since the mounting strength of the bracket 100 is reinforced, the axial offset of the external sensor S fixed to the bracket 100 can be prevented. Thus, the protection for the external sensor S can be reinforced.

Also, according to an embodiment of the disclosure, the bracket 100 is fixed to the external component B of the moving body V. The bracket 100 is fixed to the external component B of the moving body V, the bracket 100 is held between the external component B and the mounting part of the rigid component of the moving body V, and the shape of the mounting assistance surface 130 corresponds to the shape of the mounting part of the rigid component. Here, the example shown in FIGS. 3 and 4 is described. Multiple ribs 130A may also be formed on the mounting assistance surface 130 of the bracket 100 to reinforce the overall structural strength of the bracket 100. The bracket 100 is provided with multiple first mounting holes 50 (two first mounting holes 50 are provided, as an example, in the embodiment) and a second mounting hole 60. The two first mounting holes 50 are provided on two sides of the fixing surface 110 and arranged in the left-right direction. The second mounting hole 60 is provided on the mounting assistance surface 130 extending in the top-down direction. Accordingly, the bracket 100 is fixed to the external component B through the first mounting holes 50 and the second mounting hole 60. At this time, the bracket 100 is fixed to the external component B in two different directions and at different parts.

In this way, the bracket 100 is fixed to the external component B of the moving body V at different parts and in different directions. Specifically, the bracket 100 is fixed to the external component B of the moving body V in the left-right direction through the two first mounting holes 50 of the fixing surface 110 and in the top-down direction through the second mounting hole 60 on the mounting assistance surface 130. Accordingly, the bracket 100 is fixed to the mounting component B of the moving body V in different directions at the same time. In this way, the mounting strength when the bracket 100 is fixed to the moving body V is increased. Since the mounting strength of the bracket 100 is increased, the bracket 100 is able to move with the external component B within a wide range when the bracket 100 receives a load. As a result, the damage or the axial offset of the external sensor S can be suppressed, and the protection for the external sensor S can be reinforced. In other words, a load resulting from twisting is not exerted on the bracket 100, and the load can be prevented from acting on the external sensor S. Moreover, when the bracket 100 receives a load and retreats in the direction toward the moving body V, due to the presence of the rigid component of the moving body V (e.g., the sheet metal of the vehicle body), the retreat of the bracket 100 toward the moving body can be avoided as much as possible, and the load can thus be absorbed effectively. In this way, the protection for the external sensor S can be reinforced.

Figure 7:
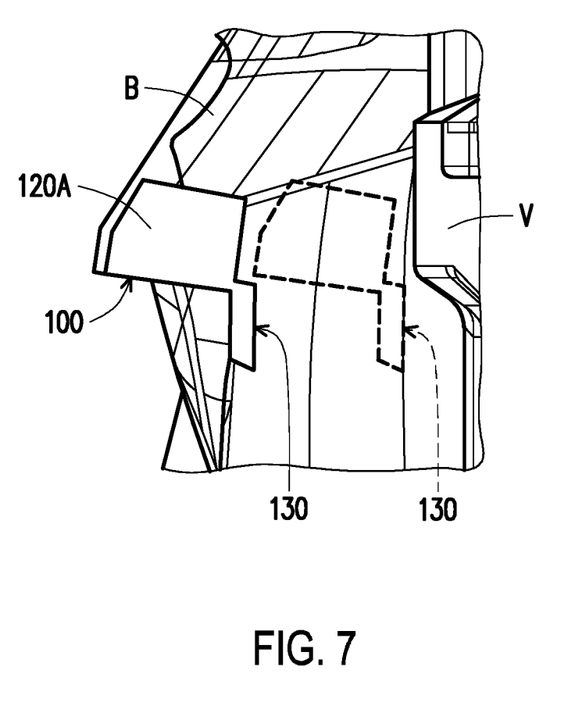
FIG. 7 is a schematic view illustrating that a sensor bracket structure according to another embodiment of the disclosure is mounted on the mounting part of the external component of the moving body.

FIG. 7 is a schematic view illustrating that a sensor bracket structure according to another embodiment of the disclosure is mounted on the mounting part of the external component of the moving body. As shown in FIG. 7, in another embodiment of the disclosure, the bracket 100 is fixed to the external component B of the moving body V, and the bracket 100 is held between the external component B and the mounting part of the rigid component of the moving body V (i.e., the sheet metal of the vehicle body). If the sheet metal of the vehicle body exhibits a stepped shape, the shape of the mounting assistance surface 130 is correspondingly arranged in a stepped shape. Accordingly, the stepped shape of the mounting assistance surface 130 corresponds to the stepped shape of the mounting part of the sheet metal of the vehicle body.

In this way, the bracket 100 is fixed to the sheet metal of the vehicle body, and when the bracket 100 receives a load so the bracket 100 contacts the external component B and retreats in the direction toward the moving body, since the stepped shape of the mounting assistance surface 130 corresponds to the stepped shape of the mounting part of the rigid component, the load generated when the mounting assistance surface 130 abuts against the sheet metal of the vehicle body is not offset. Accordingly, the external sensor can be prevented from being damaged. Thus, the protection for the external sensor can be reinforced.

Based on the above, in the sensor bracket structure according to the disclosure, since the bracket exhibits a structural design including the fixing surface and the load receiving surface, the external sensor is protected as being surrounded by a solid object, and a load does not act on the external sensor fixed to the fixing surface. Therefore, the damage or the axial offset of the external sensor can be suppressed, and the protection for the external sensor can be reinforced. Therefore, the disclosure provides a sensor bracket structure with improved quality without increasing the number of parts.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A sensor bracket structure, adapted to mount an external sensor to a moving body via a bracket, the sensor bracket structure comprising:

the bracket, comprises a fixing surface, a main load receiving surface connected to the fixing surface, and at least two subordinate load receiving surfaces connected to the main load receiving surface, such that the fixing surface and the main loading receiving surface are sandwiched between the at least two subordinate load receiving surfaces, wherein an upper side of the external sensor is covered by the main load receiving surface in a vertical direction of the moving body, and an outer side of the external sensor is covered by the at least two subordinate load receiving surfaces in a longitudinal direction of the moving body, wherein in the bracket, at least a portion of the fixing surface is surrounded by the main load receiving surface and the at least two subordinate load receiving surfaces, so that the external sensor is encompassed by the main load receiving surface and the at least two subordinate load receiving surfaces when the external sensor is fixed to the fixing surface, wherein a plurality of load receiving surfaces among the main load receiving surface and the at least two subordinate load receiving surfaces are provided on at least one of a side and another side of the fixing surface.

2. The sensor bracket structure as claimed in claim 1, wherein a connection surface connecting the load receiving surfaces is provided between the load receiving surfaces provided on the at least one of the side and the another side of the fixing surface, and the connection surface is provided on a load receiving side of the bracket.

3. A sensor bracket structure, adapted to mount an external sensor to a moving body via a bracket, the sensor bracket structure comprising:

the bracket, comprises a fixing surface, a main load receiving surface connected to the fixing surface, and at least two subordinate load receiving surfaces connected to the main load receiving surface, such that the fixing surface and the main loading receiving surface are sandwiched between the at least two subordinate load receiving surfaces, wherein an upper side of the external sensor is covered by the main load receiving surface in a vertical direction of the moving body, and an outer side of the external sensor is covered by the at least two subordinate load receiving surfaces in a longitudinal direction of the moving body, wherein the bracket further comprises a mounting assistance surface, and the mounting assistance surface is provided on a side opposite to a load receiving side of the bracket and extends along a direction toward any one of the top or a bottom, wherein the bracket is mounted on the moving body through the mounting assistance surface and the fixing surface, wherein the bracket is fixed to an external component of the moving body and held between the external component and a mounting part of a rigid component of the moving body, and a shape of the mounting assistance surface corresponds to a shape of the mounting part of the rigid component, wherein the mounting assistance surface has a stepped shape corresponding to the shape of the mounting part of the rigid component.

4. The sensor bracket structure as claimed in claim 3, wherein the bracket is fixed to an external component of the moving body.

5. A sensor bracket structure, adapted to mount an external sensor to a moving body via a bracket, the sensor bracket structure comprising:

the bracket, comprises a fixing surface, a main load receiving surface connected to the fixing surface, and at least two subordinate load receiving surfaces connected to the main load receiving surface, such that the fixing surface and the main loading receiving surface are sandwiched between the at least two subordinate load receiving surfaces, wherein an upper side of the external sensor is covered by the main load receiving surface in a vertical direction of the moving body, and an outer side of the external sensor is covered by the at least two subordinate load receiving surfaces in a longitudinal direction of the moving body, wherein the fixing surface is an inclined structure.

6. A sensor bracket structure, adapted to mount an external sensor to a moving body via a bracket, the sensor bracket structure comprising:

the bracket, comprises a fixing surface, a main load receiving surface connected to the fixing surface, and at least two subordinate load receiving surfaces connected to the main load receiving surface, such that the fixing surface and the main loading receiving surface are sandwiched between the at least two subordinate load receiving surfaces, wherein an upper side of the external sensor is covered by the main load receiving surface in a vertical direction of the moving body, and an outer side of the external sensor is covered by the at least two subordinate load receiving surfaces in a longitudinal direction of the moving body, wherein a dimension of the at least two subordinate load receiving surfaces along the longitudinal direction of the moving body is greater than the external sensor, wherein side surfaces of the external sensor and a sensing space in front of the external sensor along the longitudinal direction of the moving body are covered by the at least two subordinate load receiving surfaces.

\* \* \* \* \*